April 10, 1951
T. HEARN
2,547,940
SHAFT TESTING MACHINE
Filed June 25, 1947
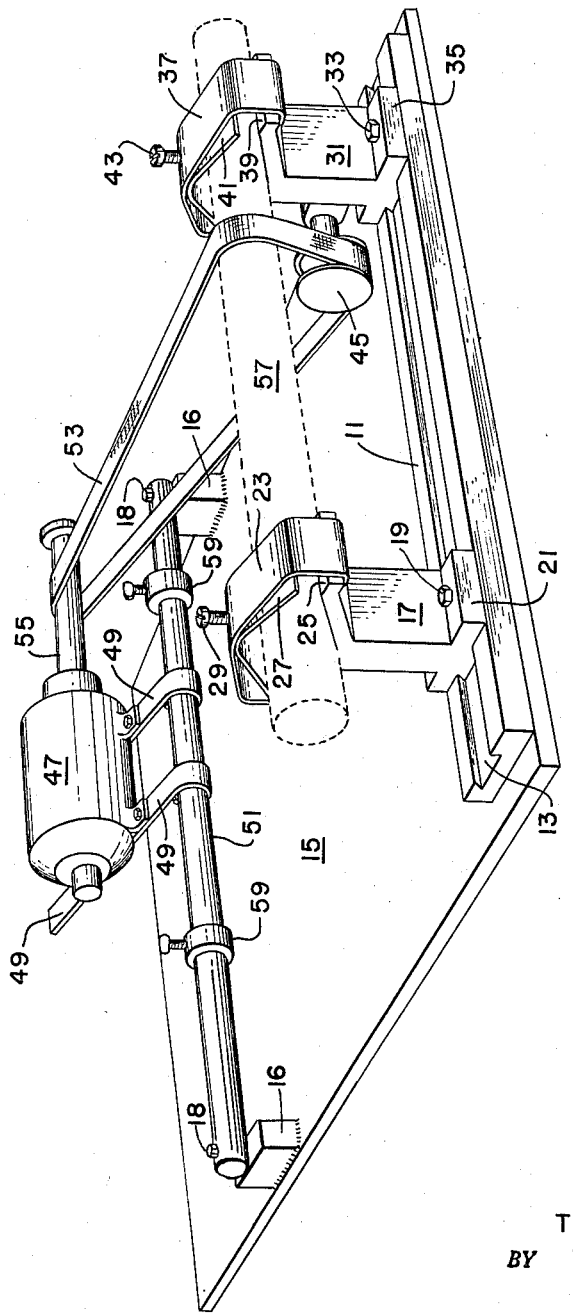
INVENTOR.
THEODORE HEARN
BY *M. A. Hayes*
ATTORNEY Patented Apr. 10, 1951

2,547,940

UNITED STATES PATENT OFFICE 2,547,940

SHAFT TESTING MACHINE

Theodore Hearn, Brooklyn, N. Y.

Application June 25, 1947, Serial No. 757,041

3 Claims. (Cl. 73—432)

(Granted under the act of March 3, 1883, as amended April 30, 1928; 370 O. G. 757)

This invention relates to improvements in testing machines, and more particularly to improvements in devices adapted to determine the balance of motor components such as armatures, rotors, shafts and centrifugal switches.

In the construction of motors, it has been common practice to machine and fabricate the component elements, employing conventional measuring devices and tests to meet allowable tolerances, and to assemble such elements in operative relation prior to testing centrifugal switches, armatures, bearings and rotors. Where faulty performance was thereafter indicated, it was necessary to dismantle the assembly in order to correct the defect.

The primary object of the present invention is to provide a testing machine of simple and durable construction adapted to determine the balance of a motor component such as an armature, rotor, shaft or centrifugal switch prior to the assembly of such component in a motor.

Another object is to provide a testing machine adapted to effect a substantial saving in time and labor in the construction of motors.

A further object is to provide a testing machine adapted to test component elements of a motor at operating speeds of rotation and under operating conditions of such elements.

Still another object is to provide a testing machine adapted to test component elements of a motor, whereby the likelihood of damage to such elements during repeated assembly and disassembly of such elements is avoided.

Another object is to provide a testing machine wherein a centrifugal switch, armature, bearing or rotor can be mounted facilely for test and can be removed readily.

Further objects and advantages of this invention, as well as its construction, arrangement and operation, will be apparent from the following description and claims in connection with the accompanying drawing, in which the figure is an isometric view of a testing machine, showing a preferred embodiment of the invention.

A slide block 11 provided with a channel 13 in a face thereof is mounted on a suitable standard or base plate 15. A first V-block 17 is engaged slidably in said channel 13, and a bolt 19 threaded through a leg flange 21 of said V-block 17 is adapted to secure said V-block in selected position in said channel 13. An inverted C-clamp 23 bridges the arm flanges 25 of V-block 17 and carries an arcuate spring-plate 27 on its nether face by means of a screw 29 threaded through a medial hole in said clamp, said screw 29 engaging said spring-plate. Spring-plate 27 is adapted, upon adjustment of screw 29, to retain an armature, rotor or shaft against the V-channel of the V-block 17.

A second V-block 31 is engaged slidably in said channel in alignment with the first V-block 17, and a bolt 33 threaded through a leg flange 35 of said V-block 31 is adapted to secure said V-block in selected position in said channel 13. An inverted C-clamp 37 bridges the arm flanges 39 of V-block 31 and carries an arcuate spring-plate 41 on its nether face by means of a screw 43 threaded through a medial hole in said clamp, said screw 43 engaging said spring-plate. Spring-plate 41 is adapted, upon adjustment of screw 43, to retain an armature, rotor or shaft against the V-channel of the V-block 31. An idler pulley 45 is mounted on the leg of V-block 31 in axial alignment with the V-channel of said V-block.

Motor 47 is mounted on a frame including arms 49, said arms being secured rotatably to slide shaft 51, which in turn is secured on base plate 15 by blocks 16 and bolts 18, shaft 51 being parallel to the shaft adapted to be carried on V-blocks 17 and 31. Endless belt 53 conveys rotation of the drive shaft 55 to the armature, rotor or shaft 57 and to the idler pulley 45, and stop-clamps 59 limit travel of motor 47 relative shaft 51.

When it is desired to test the balance of an armature, rotor or shaft 57 (shown in phantom in the drawing), V-blocks 17 and 31 are secured in channel 13 in suitable spaced relation and shaft 57 positioned upon the V-channels of said block, with belt 53 encircling shaft 57. Spring-plates 27 and 41 are then positioned in desired frictional engagement with said shaft by adjustment of screws 29 and 43 respectively, and belt 53 passed around drive shaft 55 and under idler pulley 45. Upon operation of motor 47, belt 53 rotates shaft 57, it being noted that spring-plates 27 and 41 and their respective associated C-clamps, plus the positioning of idler pulley 45, prevent shaft 57 from riding out of the V-channels of V-blocks 17 and 31. It is further apparent that suitable belt tension is maintained by virtue of the slung position of motor 47.

Various modifications and changes can be made in the subject device without departing from the scope of the invention.

The invention described herein may be manufactured and used by or for the Government of the United States of America for governmental purposes without the payment of any royalties thereon or therefor.

I claim:

1. A testing machine comprising a slide block mounted on a plate, a plurality of V-blocks engaged slidably on said slide block, said V-blocks each including means to secure said V-blocks on said slide block in spaced relation and a C-clamp bridging arm flanges thereof, said C-clamp carrying an arcuate spring-plate on its nether face adapted to abut a shaft positioned on the V-channels of said V-blocks, an idler pulley mounted on the leg of at least one of said V-blocks, a motor mounted on said plate, and an endless belt driven by said motor and driving said shaft and said pulley.

2. A testing machine comprising a slide block mounted on a plate, a plurality of V-blocks engaged slidably on said slide block, means to secure said V-blocks on said slide block in spaced relation, spring-clamp means adapted to retain a first shaft upon the V-channels of said V-blocks, an idler pulley mounted on the leg of at least one of said V-blocks, a second shaft secured on said plate parallel to said first shaft, a pair of arms carried rotatably and slidably on said second shaft, a motor mounted on said arms, and a belt driven by said motor and driving said first shaft and said pulley.

3. A testing machine comprising a slide block mounted on a plate, a plurality of V-blocks engaged slidably on said slide block, means to secure said V-blocks on said slide block in spaced relation, spring-clamp means adapted to retain a first shaft upon the V-channels of said V-blocks, an idler pulley mounted on the leg of at least one of said V-blocks, a second shaft secured on said plate parallel to said first shaft, a pair of arms carried rotatably and slidably on said second shaft, means to limit sliding movement of said arms, a motor mounted on said arms, and a belt driven by said motor and driving said first shaft and said pulley.

THEODORE HEARN.

REFERENCES CITED

The following references are of record in the file of this patent:

UNITED STATES PATENTS

| Number | Name | Date |
|---|---|---|
| 585,865 | Hamlin | July 6, 1897 |
| 1,793,801 | Hinckley | Feb. 24, 1931 |
| 1,948,866 | Norton et al. | Feb. 27, 1934 |
| 2,390,385 | Pooler | Dec. 4, 1945 |